Jan. 7, 1936.                    H. MUTH                    2,027,193
                          THERMOSTAT ARRANGEMENT
                          Filed Sept. 15, 1933

INVENTOR
HERBERT MUTH
BY
ATTORNEY

Patented Jan. 7, 1936

2,027,193

UNITED STATES PATENT OFFICE 2,027,193

THERMOSTAT ARRANGEMENT

Herbert Muth, Berlin, Germany, assignor to Telefunken Gesellschaft für Drahtlose Telegraphie m. b. H., Berlin, Germany, a corporation of Germany Application September 15, 1933, Serial No. 689,505
In Germany September 21, 1932

7 Claims. (Cl. 236—1)

This invention relates to a thermostatic device which is adapted to stabilize any desired temperature with a high degree of approximation.

According to this invention frequency fluctuations of an oscillator or wave generator evidencing a marked frequency dependency upon the temperature of the thermostat are utilized for the object of effecting changes in the heating current regulating the temperature of the thermostat by way of a frequency-responsive system.

Figure 1:
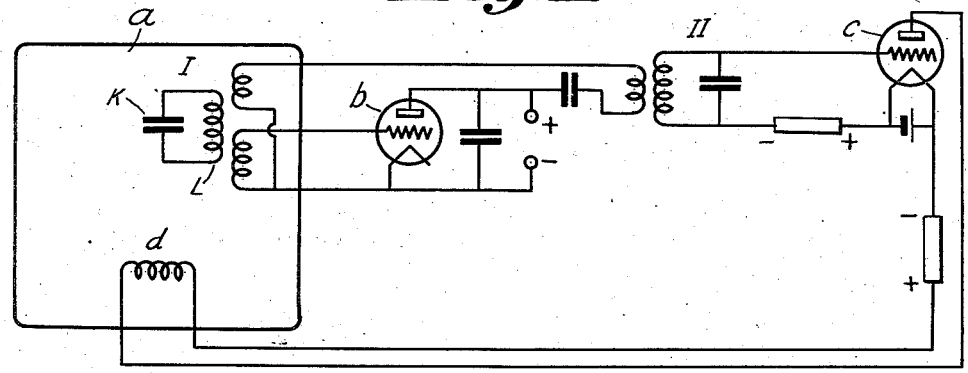
Figure 2:
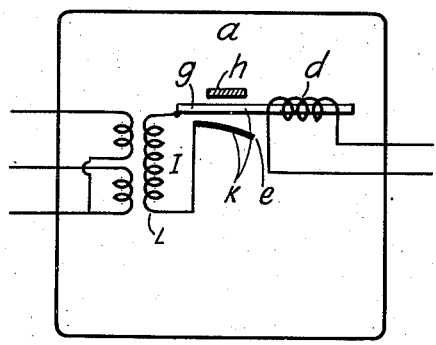
Figure 3:
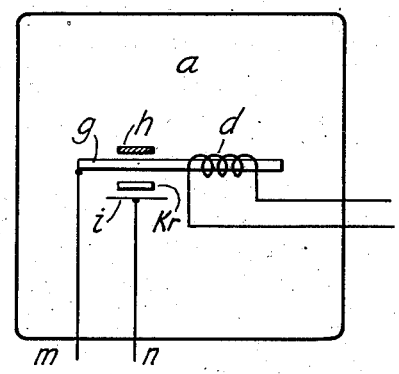
Figure 4:
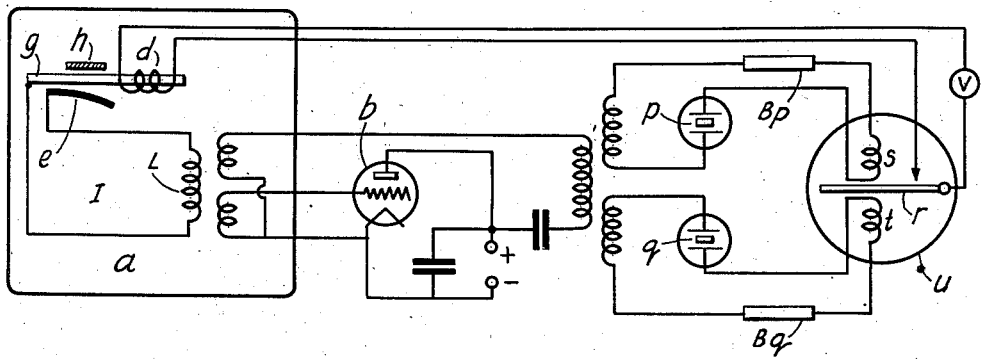

Fig. 1 is a circuit diagram showing the basic idea of this invention. Fig. 2 is a circuit of the condenser plate arrangement wherein the capacity is altered upon a change of temperature. Fig. 3 is a circuit of a quartz crystal oscillator having a high temperature coefficient of frequency. Fig. 4 is a circuit wherein the temperature is influenced by a generator consisting of two luminous quartz crystals.

Referring now to Fig. 1 the oscillation circuit I contained inside the thermostatically controlled oven or container $a$ and comprising a condenser K and an inductance L is regeneratively coupled with a wave generator $b$ whose frequency in this manner is markedly dependent upon the temperature of the thermostat. The generator $b$, in turn, is coupled with a frequency responsive, e. g., sufficiently sharply tuned circuit II. If the latter is included in the grid circuit of a rectifier $c$ then the plate current of the rectifier flowing through the heater coil $d$ of the thermostat will be a function even of the slightest alterations in the temperature of the thermostat. In this arrangement circuit II is suitably so tuned that the entire regulating range in question falls within one of the flanks or slopes of the resonance curve.

Of course, in the oscillation circuit II there could be employed instead of a rectifier $c$ some other device such as a phase-shift (phase-"leap") indicator system arranged to actuate the heating current in some suitable manner.

What is essential is that the circuit I should be greatly dependent in its frequency $f$ upon the temperature $t$, in other words, it should have as high as possible a temperature coefficient $$K\left(-\frac{df}{dt}\right)$$

of frequency. The circuit II, on the contrary, should be as little affected by the temperature as feasible. For instance, if the temperature coefficient $k$ for the circuit I amounts to $10^{-2}$ and for circuit II $3.10^{-5}$ conditions can be so made that, in the presence of temperature fluctuations of circuit II by 10 degrees C. the mean temperature inside the thermostat will vary by not over $(3.10^{-2})°$ C.

To insure in circuit I a high temperature coefficient of frequency both electrodes or coats or only one coat of condenser K could consist of bimetal strips arranged in such a way that upon the occurrence of temperature changes the distance between the electrodes and thus also the capacity is altered markedly. It is moreover of advantage to place the temperature-regulating means (i. e., circuit I and the heater coil $d$) and the object to be maintained at a constant temperature inside the thermostatically controlled oven (say, a piezo-electric crystal) as closely together as possible.

Such a construction is shown in Fig. 2.

Referring to the same, one electrode of condenser K of the oscillation circuit I is constituted by a bimetal strip $e$ and the other electrode by a plate or coat $g$, the latter being built together with the heating coil $d$ and serving at the same time as a support for the object or part to be maintained at a constant temperature, say, a piezo-electric crystal $h$.

The oscillation circuit I consisting of a separate inductance and capacity could be replaced by an oscillatory quartz (crystal) having a high temperature cofficient of frequency.

A scheme of this kind is illustrated in Fig. 3. In this case the quartz crystal oscillator Kr plays the part of circuit I. Its electrodes $g$ and $i$ by way of leads $m$, $n$, may be associated in any known way with an oscillation generator.

Fig. 4 represents a further embodiment in which the frequency dependent apparatus influenced by generator $b$ consists of two luminous quartz crystals $p$, $q$, whose natural periods are located respectively over and under the frequency of the oscillation circuit I. The said luminous crystals are suitably built in the interior of two glow-lamps (gaseous-conduction tubes), that is to say, two vessels being evacuated, fed with voltage from direct current batteries $Bp$ and $Pq$ and having electrodes of convenient material, the currents of which actuate, for instance, by way of windings $s$ and $t$ of a relay $u$, a contact $r$ included in the circuit of a source $v$ feeding the heating coil $d$. If, for instance, upon an increase in the room temperature, the temperature prevailing within the thermostatically controlled oven starts to rise with the result that the frequency of the oscillator $b$ is slightly reduced, it will as a consequence approach the somewhat lower natural period of the luminous quartz crystal $q$. As a result the said crystal is excited and is thus caused to luminesce, the glow-lamp is rendered conducting for the current, coil $t$ is energized and occasions the interruption of the heater current. The thermostat begins to cool, the frequency of $b$ rises again, and approaches the higher natural period of the crystal $p$. The latter is caused to luminesce, coil $s$ is energized, disconnects the heater circuit and the cycle is repeated so that the temperature fluctuates inside the thermostatically controlled oven between two limital values which may be chosen as closely together as may be desired and which are governed by the natural periods of the luminous crystals.

I claim:

1. An arrangement for controlling temperature comprising a container, an oscillating circuit comprising a condenser and an inductance within said container, the natural frequency of said circuit varying with its temperature, a tube generator coupled to said circuit whereby said circuit controls the frequency of electrical oscillations produced by said generator, a tuned circuit coupled to said generator, a rectifier connected to said tuned circuit and means responsive to the output current flow of said rectifier for controlling the temperature of said container.

2. Apparatus as claimed in claim 1, characterized by the fact that a heating coil is mounted within said container and connected to said rectifier whereby output current of said rectifier flows through said heating coil.

3. Apparatus as claimed in claim 1, characterized by the fact that the condenser of said oscillation circuit has a capacity element formed of a bimetallic strip responsive to temperature variations.

4. A thermostatic arrangement for stabilizing a desired predetermined temperature comprising two oscillating circuits coupled together, one of said circuits having its frequency largely dependent upon its temperature and coupled to the other circuit whose frequency is only slightly dependent upon its temperature, thermostatic means in said first mentioned circuit which is coupled with a heating coil connected in the second-mentioned circuit whereby a slight frequency change will cause a current to flow from the second mentioned circuit to the heating coil, said heating coil being actuated by said thermostatic means and heated by a rectifier which is also connected in said second mentioned circuit.

5. A thermostatic arrangement for stabilizing a desired predetermined temperature comprising two oscillating circuits coupled together at least one of said circuits having a piezo-electro crystal whose temperature is to be controlled, the other, one of said circuits having its frequency greatly dependent upon its temperature, said circuit comprising a thermostat having a condenser, a bi-metallic strip acting as one of the condenser electrodes, the other electrodes of said condenser being associated with a heating coil and an inductance in the second oscillating circuit having a rectifier for supplying plate current to said heating coil.

6. A thermostatic arrangement for stabilizing a desired predetermined temperature comprising two oscillating circuits coupled together, at least one of said circuits having a piezo-electric crystal whose temperature is to be controlled, the other one of said circuits having its frequency greatly dependent upon its temperature, said circuit comprising a thermostat having a condenser having one of its electrodes composed of a bimetallic strip, the other electrode of said condenser arranged integral with a heating coil which also serves as a support for said piezo-electric crystal, an inductance coupled with a second oscillating circuit having a rectifier for supplying plate current to said heating coil.

7. A thermostat arrangement for stabilizing a desired predetermined temperature comprising two oscillating circuits at least one oscillating circuit controlling the other oscillating circuit, one of said circuits having two luminous quartz crystals, one of said luminous quartz crystals arranged to be responsive to a frequency above the frequency of the oscillating circuit to be controlled, the other crystal having a frequency below the frequency of the oscillating circuit to be controlled, a glow lamp and a relay arranged with said luminous quartz crystals to supply heating current to heat a heating coil located with and coupled to said first mentioned circuit.

HERBERT MUTH.